US007429284B2

(12) United States Patent
Oh et al.

(10) Patent No.: US 7,429,284 B2
(45) Date of Patent: Sep. 30, 2008

(54) CYCLONE DUST COLLECTING APPARATUS

(75) Inventors: Jang-Keun Oh, Gwangju (KR); Sung-Cheol Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 481 days.

(21) Appl. No.: 11/071,860

(22) Filed: Mar. 3, 2005

(65) Prior Publication Data

US 2006/0075728 A1 Apr. 13, 2006

(30) Foreign Application Priority Data

Oct. 8, 2004 (KR) ...................... 10-2004-0080358

(51) Int. Cl.
*B01D 45/12* (2006.01)

(52) U.S. Cl. ............................ 55/343; 55/349; 55/416; 55/429; 55/459.1; 55/DIG. 3

(58) Field of Classification Search ................... 55/343, 55/349, 414, 416, 459.1, DIG. 3, 429
See application file for complete search history.

(56) References Cited

U.S. PATENT DOCUMENTS

| | | | | |
|---|---|---|---|---|
| 1,766,237 | A | 6/1930 | Whitmore | |
| 2,553,175 | A | 5/1951 | Davenport et al. | 183/83 |
| 2,771,157 | A | 11/1956 | Gustavsson | 183/83 |
| 2,936,043 | A | 5/1960 | Armstrong et al. | |
| 3,425,192 | A | 2/1969 | Davis | 55/345 |
| 5,013,342 | A | 5/1991 | Leussler et al. | 55/337 |
| 5,180,257 | A | 1/1993 | Narishima et al. | 406/173 |
| 5,466,372 | A | 11/1995 | Jerabek et al. | 210/512 |
| 6,238,451 | B1 | 5/2001 | Conrad et al. | 55/323 |
| 7,169,201 | B2 * | 1/2007 | Oh et al. | 55/343 |
| 2005/0252180 | A1 | 11/2005 | Oh et al. | 55/345 |

FOREIGN PATENT DOCUMENTS

| | | | |
|---|---|---|---|
| DE | 134360 | | 10/1901 |
| DE | 102004028675 | A1 | 4/2005 |
| DE | 102005008475 | A1 | 3/2006 |
| EP | 0371531 | | 6/1990 |
| FR | 2619498 | A1 | 2/1989 |
| GB | 245636 | | 3/1925 |

(Continued)

OTHER PUBLICATIONS

Second Office Action dated Mar. 23, 2007 issued from the Chinese Patent Office with respect to the Chinese Patent Application No. 200510062678.3.

(Continued)

*Primary Examiner*—Robert A Hopkins
(74) *Attorney, Agent, or Firm*—Ohlandt, Greeley, Ruggiero & Perle, LLP.

(57) ABSTRACT

A cyclone dust collecting apparatus comprises at least one second cyclone unit having a first cyclone unit, an air passage for guiding air discharging via the first cyclone unit, and a discharge pipe wherein the discharge pipe comprises a passage guide member for guiding air discharged from the second cyclone unit. Because the passage guide member is mounted in the discharge pipe of the second cyclone part, a load of suction source reduces to decrease power consumption for operation of a cyclone dust collecting apparatus.

8 Claims, 11 Drawing Sheets

FOREIGN PATENT DOCUMENTS

| | | | |
|---|---|---|---|
| GB | 727215 | | 6/1953 |
| GB | 2410913 | | 8/2005 |
| JP | 52-149666 | | 12/1977 |
| JP | 52149666 | | 12/1977 |
| JP | 52149666 | A | 12/1977 |
| SU | 187666 | | 8/1965 |
| WO | 02/067755 | | 9/2002 |
| WO | WO 02/067755 | | 9/2002 |

OTHER PUBLICATIONS

Office Action dated Nov. 10, 2006 issued from the Chinese Patent Office with respect to Chinese Patent Application No. 200510062678.3 filed on Apr. 5, 2005 (w/ English translation).

British Combined Search and Examination Report dated Jul. 22, 2005.

Office Action dated Apr. 24, 2007 from the German Patent and Trademark Office with respect to the corresponding Patent Application File No. 102005015004.7-15.

Examination Report dated Jul. 13, 2006 issued from the Australian Patent Office in connection with corresponding Australian Patent Application No. 2005201202 filed on Mar. 21, 2002.

Office action dated Jul. 6, 2007 from corresponding Spanish Patent Application Serial No.200500745.

Preliminary Search Report dated Aug. 6, 2007 corresponding to French Patent Application No. 0503237.

* cited by examiner

CYCLONE DUST COLLECTING APPARATUS

CROSS-REFERENCE TO RELATED APPLICATIONS

This application claims the benefit of Korean Patent Application No. 2004-80358 filed on Oct. 8, 2004, in the Korean Intellectual Property Office, the disclosure of which is incorporated herein by reference in its entirety.

BACKGROUND OF THE INVENTION

1. Field of the Invention

The present invention relates to a vacuum cleaner, and more particularly to a multi-cyclone dust collecting apparatus wherein a plurality of cyclone dust collecting apparatuses are in parallel arranged.

2. Description of the Related Art

Generally, a cyclone dust collecting apparatus rotates drawn-in air at a high speed to separate and collect contaminants from the air. The cyclone dust collecting apparatus can be almost permanently used, however, is inferior to a cyclone dust collecting apparatus using dust bag or dust filter in collecting minute dust. Accordingly, a multi cyclone dust collecting apparatus capable of collecting minute dust has been developed.

A multi cyclone dust collecting apparatus comprises a first cyclone part and a second cyclone part, the first cyclone part first separates large contaminants, and then the second cyclone part centrifugally separates the air cleaned from the first cyclone part to collect minute dust. The multi cyclone dust collecting apparatus is superior to a conventional cyclone dust collecting apparatus in collectivity of minute dust.

However, if the multi cyclone dust collecting apparatus is applied, an air passage is complicated in a collecting apparatus such that load of a vacuum suction source increases and air flow noise generates. Particularly, air cleaned from the second cyclone part forms a rotation stream to be discharged via a discharge pipe provided in the second cyclone part by an inertia force of the rotation stream. At this time, the air discharged from the discharge pipe hits the interior surface of the discharge pipe, or collides with the air discharged from the second cyclone part to form turbulence and causes a pressure loss in the discharge pipe. The pressure loss increases load of a suction source and power consumption.

WO 02/267755A1 filed on Sep. 6, 2002 is an example of the multi cyclone dust collecting apparatus. In the WO 02/067755A1, the second cyclone part has a centrebody in a discharge pipe to reduce pressure loss of the discharge pipe. The centrebody, however, blocks a center portion of the discharge pipe such that contaminants such as hair often obstruct the discharge pipe.

A discharge pipe of the second cyclone part having a centrebody is smaller than a discharge pipe in cross section such that current speed of air passing the discharge pipe increases. The stiff increase of current speed of discharged air generates air flow noise in the discharge pipe and operation noise of a cyclone dust collecting apparatus also increases.

SUMMARY OF THE INVENTION

The present invention has been conceived to solve the above-mentioned problems occurring in the prior art, and an aspect of the present invention is to provide a cyclone dust collecting apparatus which reduces a pressure loss by a turbulence incurred during discharging the cleaned air to decrease a overall noise.

In order to achieve the above aspects, there is provided a cyclone dust collecting apparatus comprising at least one second cyclone unit having a first cyclone unit, an air passage for guiding air discharging via the first cyclone unit, and a discharge pipe, wherein the discharge pipe comprises a passage guide member for guiding air discharged from the second cyclone unit.

The passage guide member may comprise a plurality of guide ribs formed in an inner circumference of the discharge pipe.

The guide ribs may be protruded from the inner circumference of the discharge pipe in an inward direction.

The guide ribs may leave an air passage in a center of the discharge pipe.

The guide ribs may be spaced apart from the inlet end of the discharge pipe in a direction of air movement.

The guide ribs may be spaced apart from the inlet end of the discharge pipe in a direction of air movement.

The guide ribs may comprise a bent part and a linear part.

The bent part may be disposed at an inlet end of the discharge pipe, and the linear part is disposed at an outlet end of the discharge pipe, and the bent part and the linear part are integrally formed with each other.

The bent part may comprise a round part to prevent contaminants in the air from blocking the discharge pipe. The bent part may be twisted.

In order to achieve the above aspects, there is provided a cyclone dust collecting apparatus comprising: a cyclone body unit having a plurality of second cyclone bodies disposed along the first cyclone; an inlet and outlet unit engaged with an upper portion of the cyclone body unit, and having an air passage and a discharge pipe of the second cyclone unit; a cover collecting air discharged from the plurality of second cyclone unit to guide to a cleaner body; a sealing member disposed between the cyclone body unit and the inlet and outlet unit; a dust collecting receptacle engaged with a lower portion of the cyclone body unit for collecting contaminants; wherein the discharge pipe comprises at least one guide rib protruded from an inner circumference toward a center.

The guide ribs may be spaced at a certain interval along the inner circumference of the discharge pipe.

The guide ribs may be protruded from the inner circumference of the discharge pipe as high as 5 percent to 45 percent of the inside diameter of the discharge pipe.

The guide ribs may comprise a linear part and a bent part, and the bent part is twisted.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE EXEMPLARY EMBODIMENTS

Figure 1:
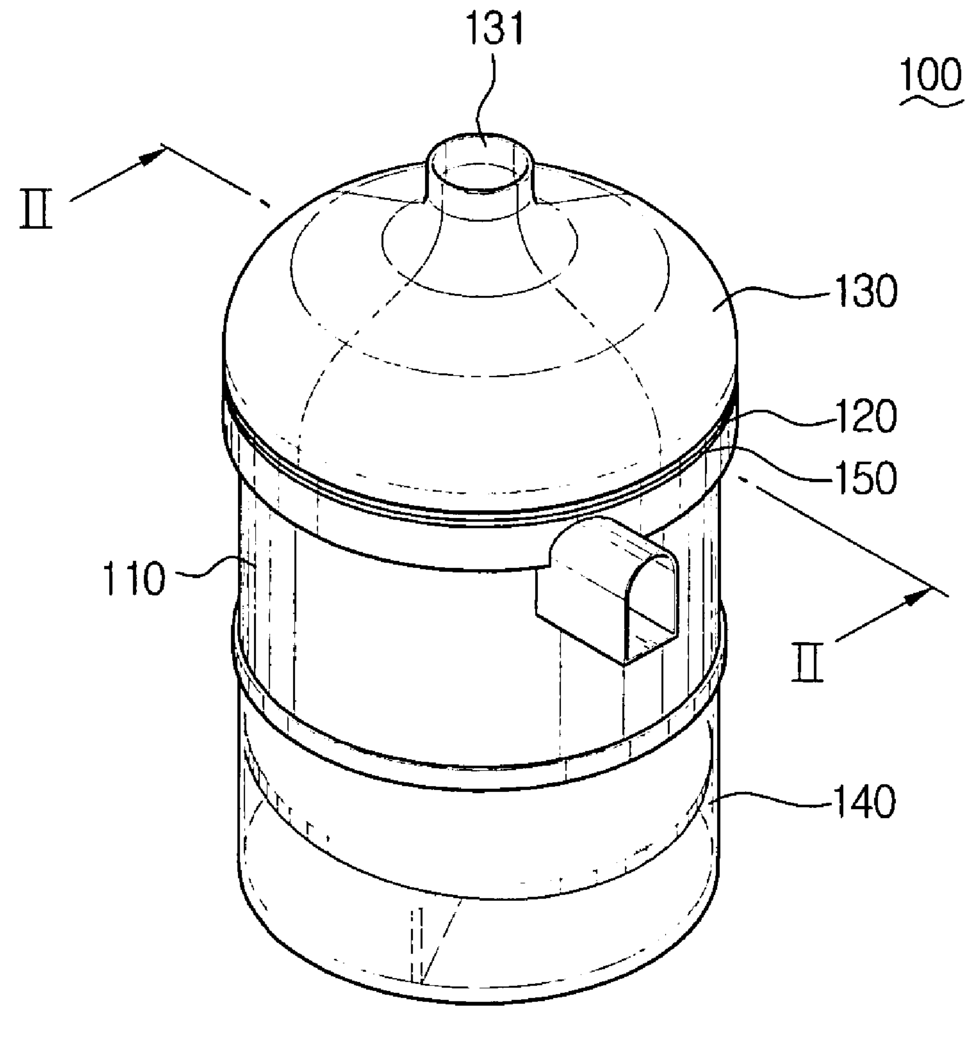
FIG. 1 is a perspective view of a cyclone dust collecting apparatus according to an embodiment of the present invention.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
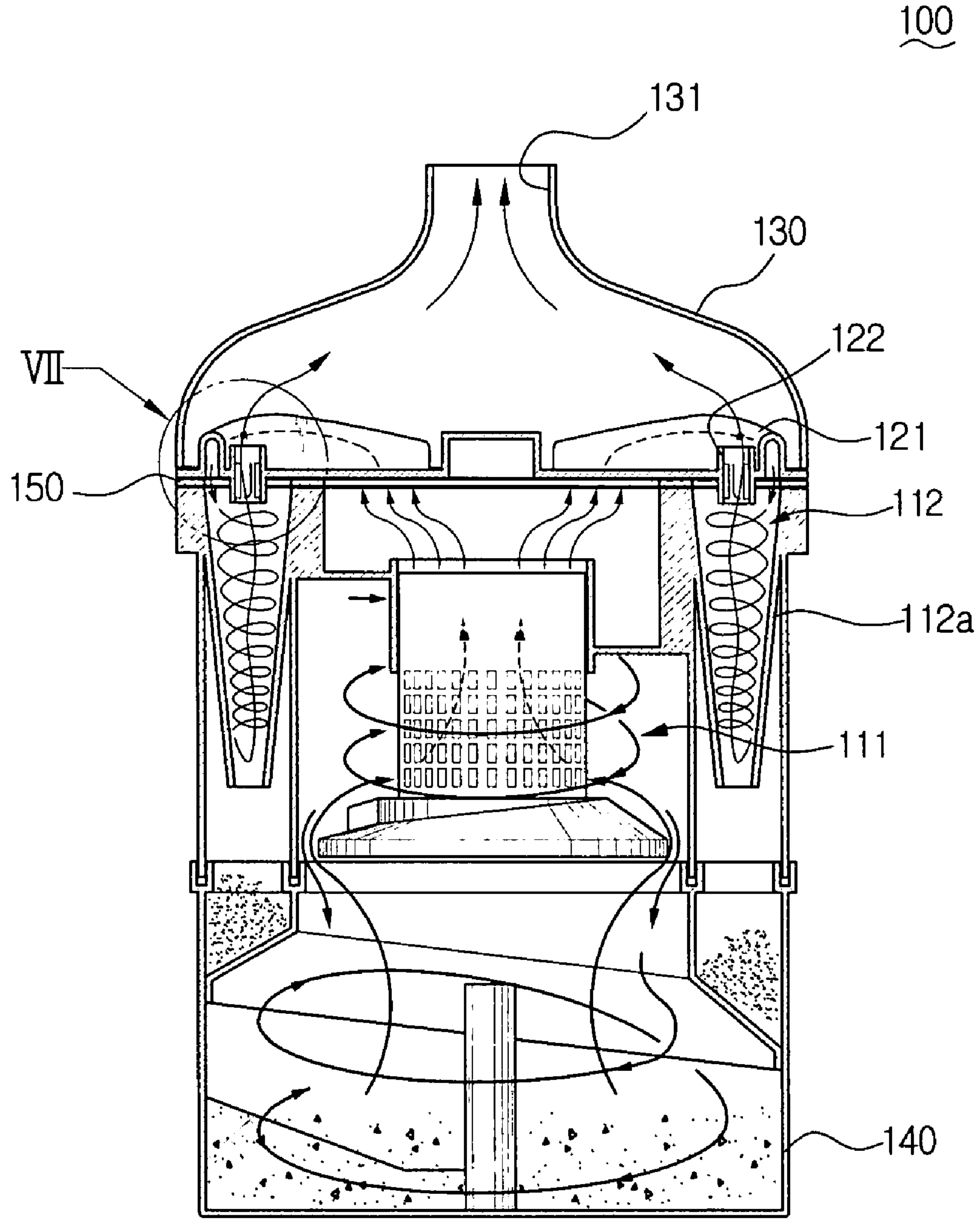
FIG. 2 is a cross-sectional view of a cyclone dust collecting apparatus taken on II-II line of FIG. 1.
Figure 3:
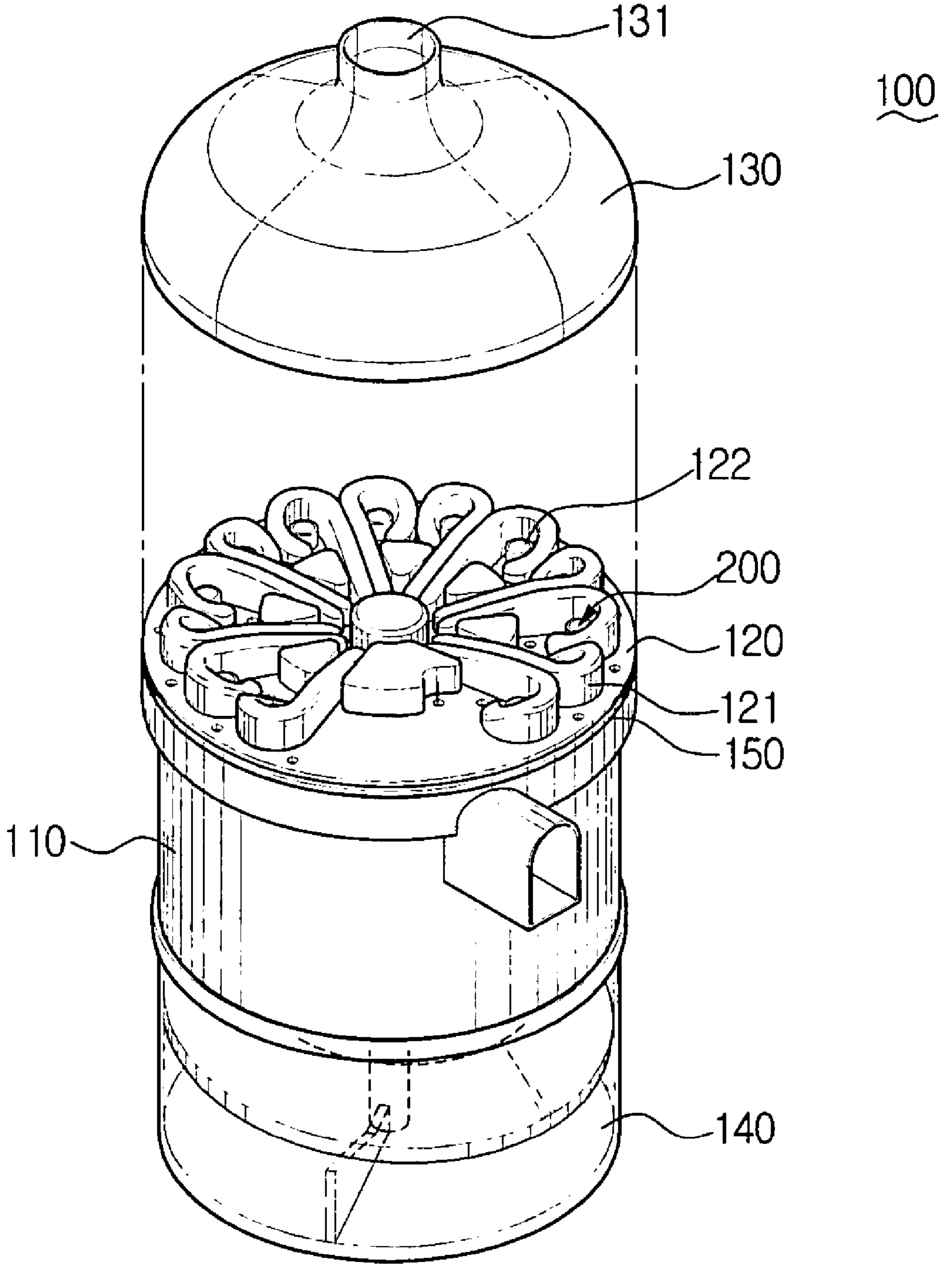
FIG. 3 is a perspective view of a cyclone dust collecting apparatus with a separated cover.

Referring to FIGS. 1 to 3, a cyclone dust collecting apparatus 100 comprises a cyclone body unit 110, an inlet and outlet unit 120 engaged with a top surface of the cyclone body unit 110, a cover 130, a dust collecting receptacle 140 detachably engaged with a bottom surface of the cyclone body unit 110, a seal member 150 provided between the cyclone body unit 110 and the inlet and outlet unit 120 for preventing suction loss, and an air passage guide member 200 (refer to FIG. 2) disposed in a discharge pipe 122 of an inlet and outlet unit 120.

As shown in FIG. 2, the cyclone body unit 110 comprises a first cyclone unit 111 disposed in a substantial center of body and a second cyclone unit body 112*a* disposed around the first cyclone unit 111. Large contaminants are collected in the first cyclone unit 111 and minute dusts or contaminates are collected in the second cyclone unit 112.

The inlet and outlet unit 120 is engaged with a top portion of the cyclone body unit 110 as shown in FIG. 3, an air passage 121 and a discharge pipe 122 of the second cyclone unit 112 are arranged in each second cyclone body 112*a*, and the air passage 121 and the discharge pipe 122 each distribute air discharged from the first cyclone unit 111 to the second cyclone body 112*a*.

Figure 4:
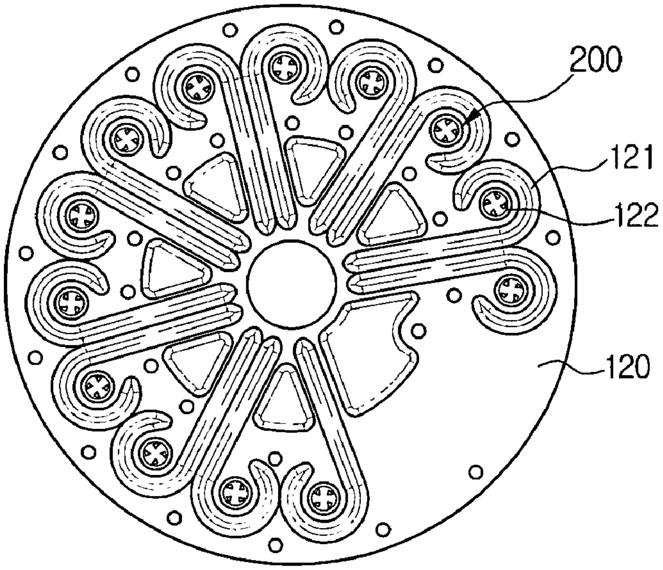
FIG. 4 is a plan view of a first cover of a cyclone dust collecting apparatus according to first embodiment of the present invention.

The air passage 121 encloses the discharge pipe 122 to connect with each of a plurality of the second cyclone bodies 112*a* arranged around the first cyclone unit 111 as shown in FIG. 4.

Figure 7:
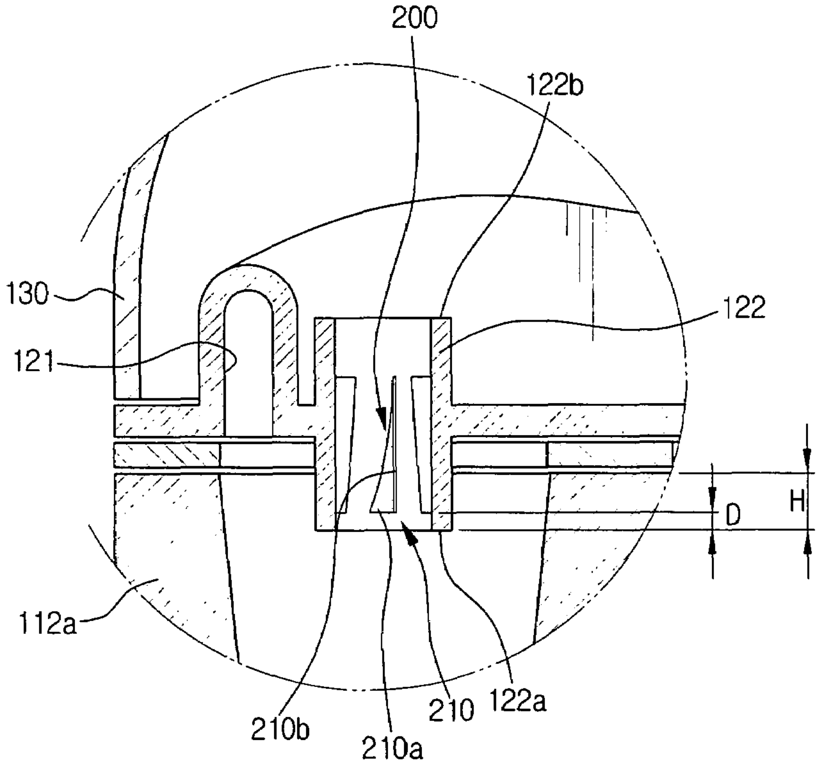
FIG. 7 is a cross-sectional view of an important portion of FIG. 2.

The discharge pipe 122 is located on a substantial center of the second cyclone body 112*a*, and an inlet end 122*a* of the discharge pipe 122 is inserted into the second cyclone body 112*a* by a certain height H (refer to FIG. 7). A passage guide member 200 is provided in the discharge pipe 122 to reduce a current speed of discharged air and guide a streamline flow of the air. The passage guide member 200 will be explained in detail hereinafter.

The cover 130 is engaged with an upper portion of the inlet and outlet unit 120 as shown in FIG. 3, and collects air discharged from the discharge pipe 122 to discharge the air via a connection opening to the cleaner body.

The dust collection receptacle 140 is detachably mounted to a bottom surface of the cyclone body unit 110.

The passage guide member 200 is mounted in the discharge pipe 122 as shown in FIG. 4, reduces a current speed of air flown in the discharge pipe 122 and guides a streamline flow of the flown air to prevent turbulence.

Figure 5:
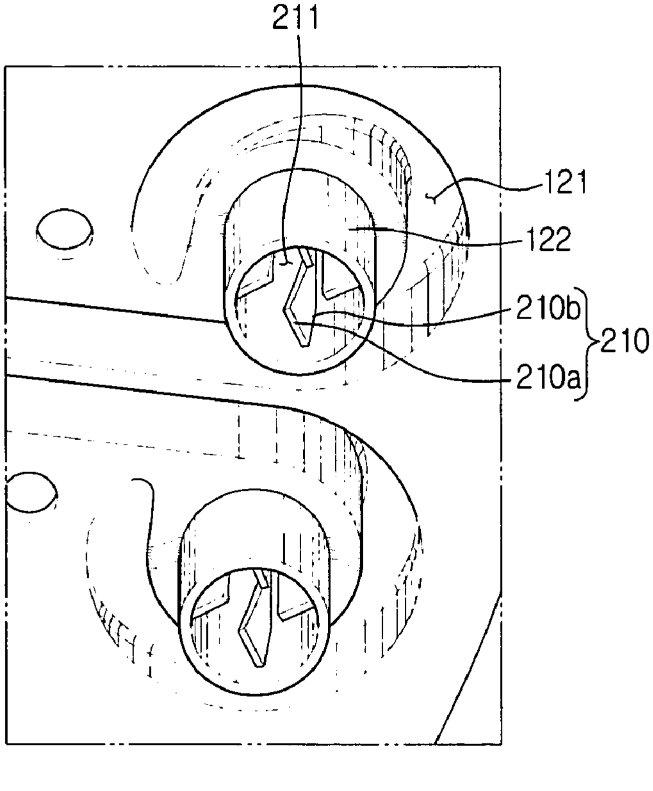
FIG. 5 is a perspective view of a bottom surface of an inlet and outlet unit of a cyclone dust collecting apparatus according to an embodiment of the present invention.

The passage guide member 200 may be separately mounted in the discharge pipe 122 or, according to an exemplary embodiment of the present invention, may be protruded to a center from an inner circumference of the discharge pipe 122 as shown in FIG. 5.

Figure 6:
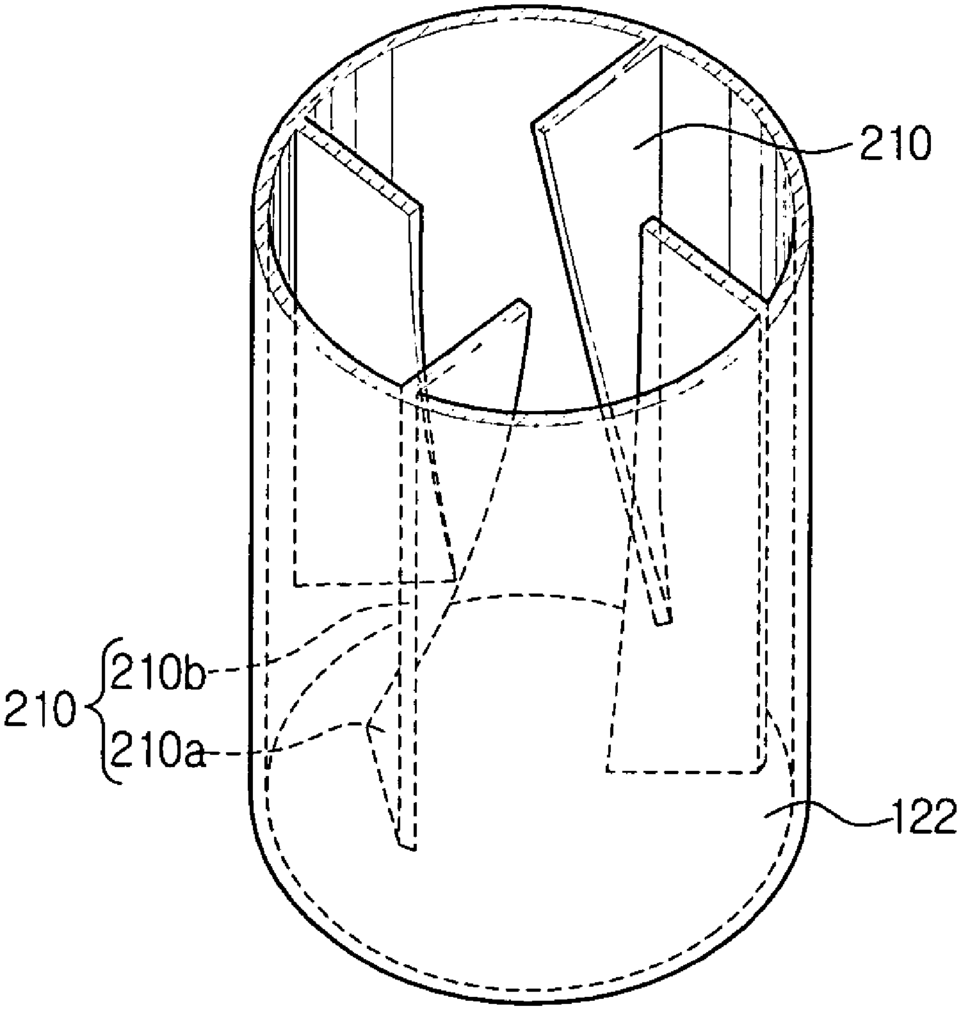
FIG. 6 is a perspective view of a discharge pipe of a cyclone dust collecting apparatus according to an embodiment of the present invention.

The passage guide member 200 according to an exemplary embodiment of the present invention will be explained hereinafter, which is integrally configured with the discharge pipe 122 and has four twisted guide ribs 210 as shown in FIGS. 5 and 6.

The passage guide member 200 comprises four guide ribs 210 spaced at a regular interval to form an air passage 211 in a center of the discharge pipe 122 as shown in FIG. 5. The air passage 211 is configured in a substantial center portion in the discharge pipe 122, and the cleaned air discharged via the air passage 211 is not interfered with the guide ribs 210 to be discharged faster than discharging air guided by the guide ribs 210. Contaminants such as hair having been unfiltered from the second cyclone unit 112 can be discharged via the air passage 211. The guide ribs 210 are protruded from the inner circumference of the discharge pipe 122 in a direction toward the center of the discharge pipe 122, and the protruded length is approximately 5 percent to 45 percent of the inside diameter of the discharge pipe 122.

The guide ribs 210 comprises a bent part 210*a* and a linear part 210*b* as shown in FIGS. 5 and 6, and is disposed in the discharge pipe 122 apart from an inlet end 122*a* in a certain distance D.

The bent part 210*a* is twisted towards the inlet end 122*a* of the discharge pipe 122. The bent part 210*a* reduces a current speed of air discharged via the discharge pipe 122 from the second cyclone body 112*a*, and guides the discharged air to the linear part 210*b*. The twisted bent part 210*a* smoothly guides rotating air discharged from the second cyclone unit 112 to prevent air discharged via the discharge pipe 122 from forming turbulence due to stiff change of air passage.

The linear part 210*b* is in parallel arranged with the discharge pipe 122 in a length direction, and streamlines air guided from the bent part 210*a* to guide the air to the outlet end 122*b* of the discharge pipe 122.

Figure 8:
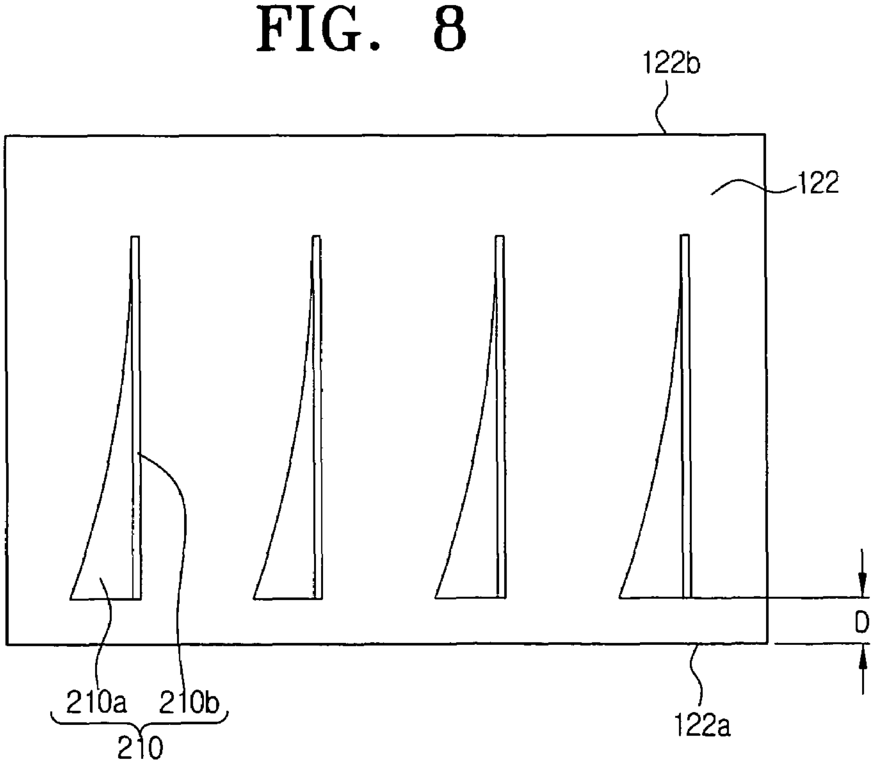
FIG. 8 is a development view of a discharge pipe of FIG. 6.

FIG. 8 is a development view of the discharge pipe 122 to examine the arrangement of the guide ribs 210. Referring to FIG. 8, the bent parts 210*a* are twisted in the same directions.

The operation of the cyclone dust collecting apparatus 100 will be explained with reference to the drawings.

If contaminant-laden air is drawn in the cyclone dust collecting apparatus 100 according to an embodiment of the present invention, the air rotates along the inner circumference in the first cyclone unit 111 as arrows shown in FIG. 2 to descend to the dust-collecting receptacle 140. The contaminant-laden air rotates and descends to centrifugally separate contaminants from the air, and large contaminants are firstly collected on a bottom surface of the dust-collecting receptacle 140.

The air separating contaminants from the first cyclone unit 111 ascends to an upper portion of the first cyclone unit 111, and distributes to each of the second cyclone bodies 112*a* via a plurality of air passage 121 of the inlet and outlet unit 120.

The air flowing in the second cyclone unit 112 via the air passage 121 forms a rotating stream in the second cyclone body 112*a* to separate minute dust and collect the separated dust in the dust collecting-receptacle 140. The cleaned air is discharged via the discharge pipe 122 to a space part formed under a cover 130.

The discharge pipe 122 is inserted in the second cyclone body 112*a* at a certain depth H (refer to FIG. 7) to prevent the turbulence of the cleaned air discharged via the discharge pipe 122 from disturbing a rotating stream formed in the second cyclone body 112*a*.

The passage guide member 200 having four guide ribs 210 is disposed in the discharge pipe 122 to streamline and discharge the cleaned air discharged via the discharge pipe 122. The passage guide member 200 prevents the turbulence inside the discharge pipe 122 from disturbing air flowing and discharging of air. Therefore, pressure loss can be reduced in the discharge pipe 122.

To streamline air discharged via the discharge pipe 122, the guide ribs 210 have the bent part 210*a* which is twisted in the same direction as shown in FIGS. 7 and 8. The bent part 210 smoothly guides the rotation of air flowing into the discharge pipe 122 to reduce the rotation of cleaned air. The bent part 210 can also block flowing air to reduce the current speed thereof so as to prevent the current speed from generating noise in the discharge pipe 122.

An air passage 211 (refer to FIG. 5) without the guide ribs 210 is disposed in a center of the discharge pipe 122 so as to prevent the discharge pipe 122 from blocking due to tangled contaminants such as hair.

The air discharged via the air passage 211 is discharged to the outlet end 122*b* (refer to FIG. 7) of the discharge pipe 122, while forming a main stream. The air stream forming along the inner circumference of the discharge pipe 122 by the guide ribs 210 can prevent turbulence incurred when a main stream discharged via the air passage 211 collides the inner circumference of the discharge pipe 122.

The guide ribs 210 is spaced apart from an inlet end 122*a* by a certain distance D in the discharge pipe 122 as shown in FIG. 8 so as to prevent a still stream forming when air discharged via the second cyclone unit 112 collides a bent part 210*a* from influencing a rotating stream forming in the second cyclone body 112*a*.

The guide member 210 reduces a pressure loss caused by turbulence incurring when the discharge pipe of the second cyclone unit 112 discharges cleaned air, and therefore load of a suction source can decrease and power consumption for operation of the cyclone dust collecting apparatus 100 can reduce.

Because the guide member 210 reduces the current speed of clean air flowing in the discharge pipe 122, mutual noise can decrease which is incurred in the discharge pipe 122 due to stiff change of air current speed to provide a silent cyclone dust collecting apparatus 100.

Figure 9A:
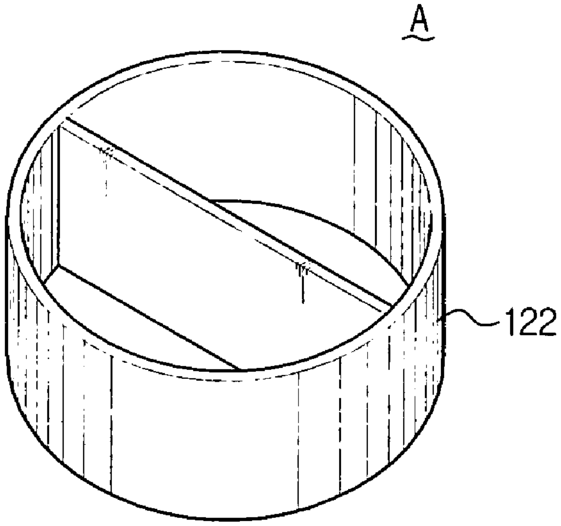
FIGS. 9A to 9E are perspective views of exemplary embodiments of guide ribs according to the present invention.
Figure 9B:
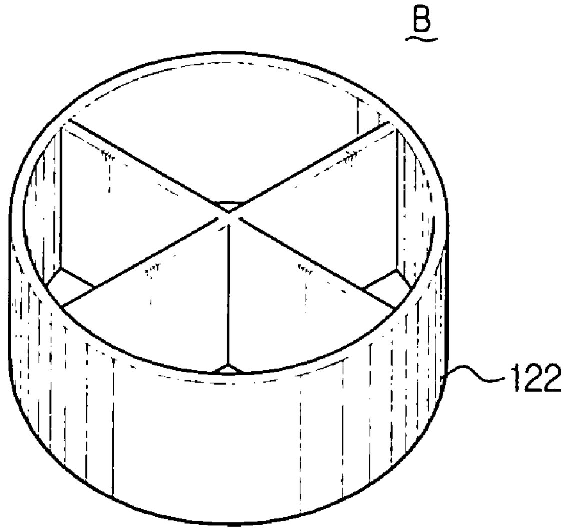
Figure 9C:
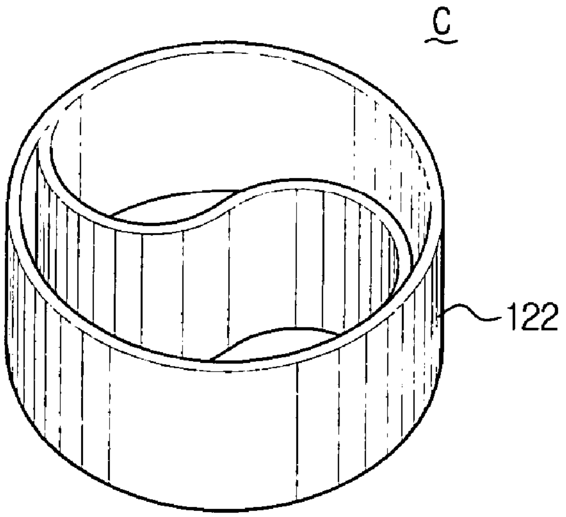
Figure 9D:
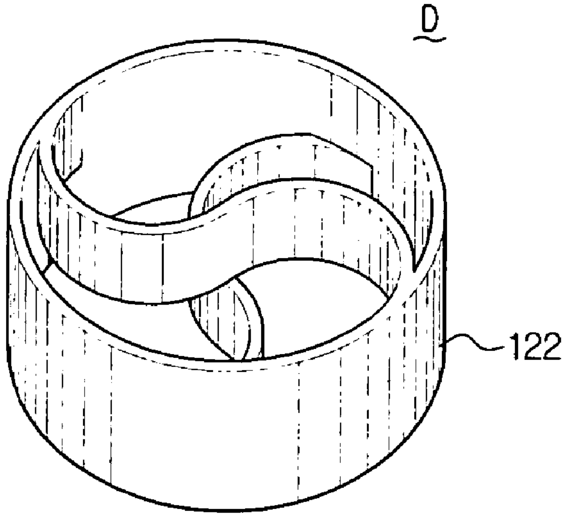
Figure 9E:
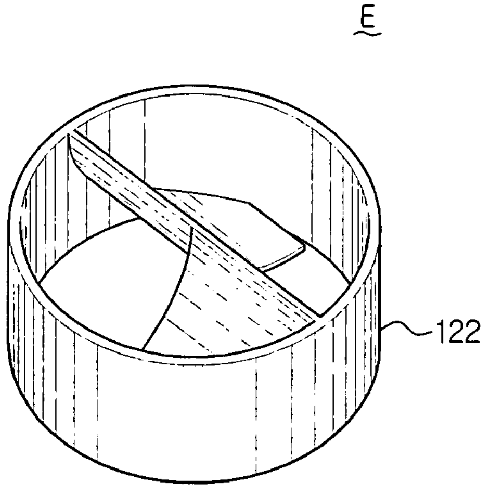

In order to check effect of the twisted guide ribs 210 (F type of FIGS. 5 and 6), dust of eight (8) class having an average particle size of 7.5 μm is experimented with a discharge speed 20 m/s via the discharge pipe 122 while varying the shape of air passage member 200 from A to F types as shown in FIGS. 9A to 9E. FIG. 9A shows a linear guide rib (A type) across the discharge pipe 122, FIG. 9B shows a cross-shaped guide rib (B type) crossing the discharge pipe 122, FIG. 9C shows a S-shaped guide rib (C type) dividing the discharge pipe 122, FIG. 9D shows two S-shaped guide ribs (D type) arranging to be traverse to each other and FIG. 9E shows two guide ribs (E type) dividing the discharge pipe 122 and having two bent parts which curve in opposite directions.

Figure 10:
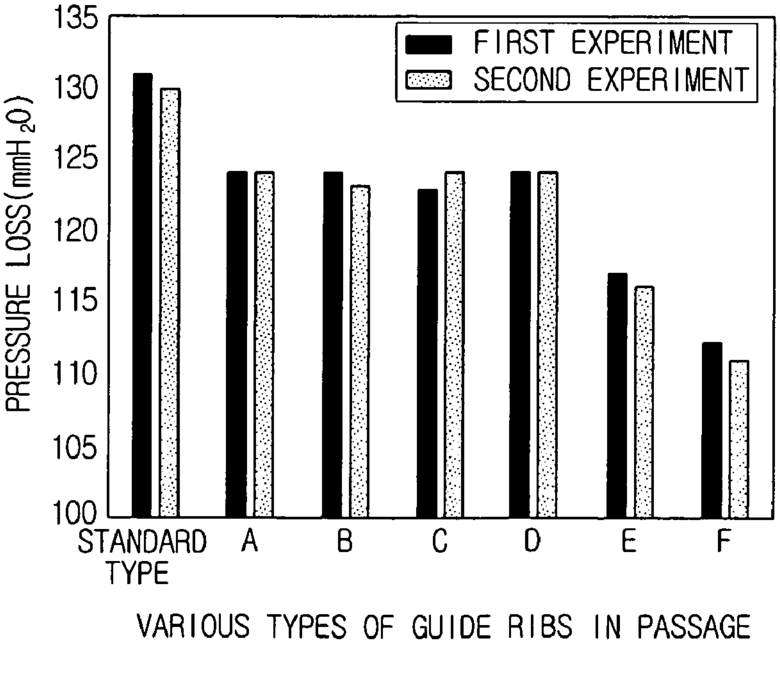
FIG. 10 is a graph illustrating a demonstration result of a cyclone dust collecting apparatus having an air passage guide part.

As comparing the dust-collecting efficiencies between the standard type in case of dismounting the guide ribs 210 and the A to C types in case of mounting the guide ribs 210, the guide ribs 210 can be determined not to influence the dust-collecting efficiency. This is because that the guide ribs 210 does not influence on air flowing in the first cyclone unit 111 and the second cyclone body 112*a*. As shown in the graph of FIG. 10, if guide ribs of A to E types as shown in FIGS. 9A through 9E and guide ribs 210 of F type having a twisted bent part according to the present embodiment as shown in FIGS. 5 and 6 are mounted, a pressure loss reduces by 7 to 15% as comparison with the case (the standard type) of dismounting the guide ribs. Particularly, if F type of the guide ribs according to the present embodiment is applied, the pressure loss reduces as comparison with the case if A through E types of the guide ribs are applied.

Figure 11:
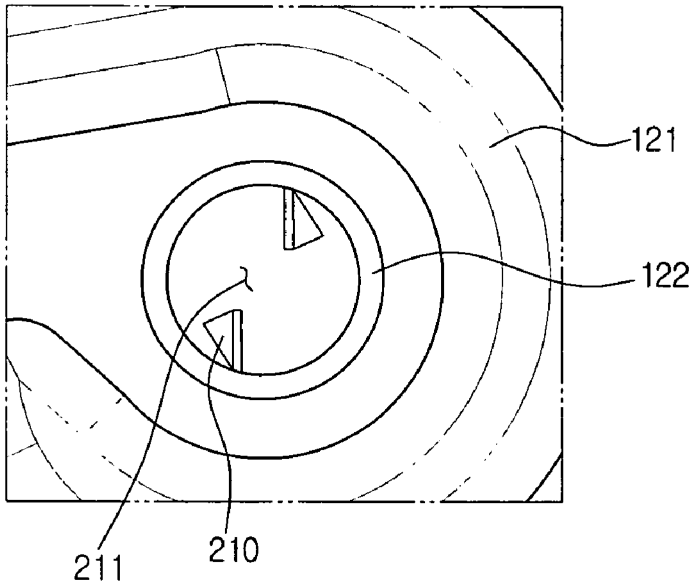
FIGS. 11 and 12 are enlarged views of discharge pipes having air passage guide member according to alternate exemplary embodiments of the present invention.
Figure 12:
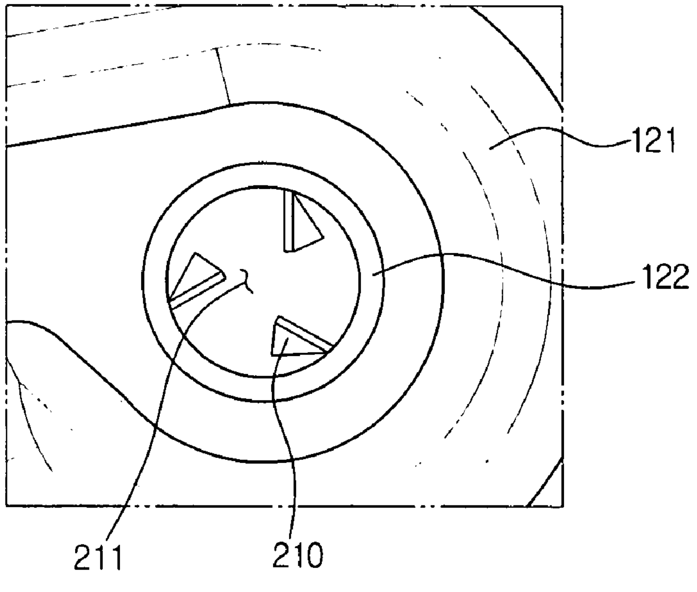
Figure 13:
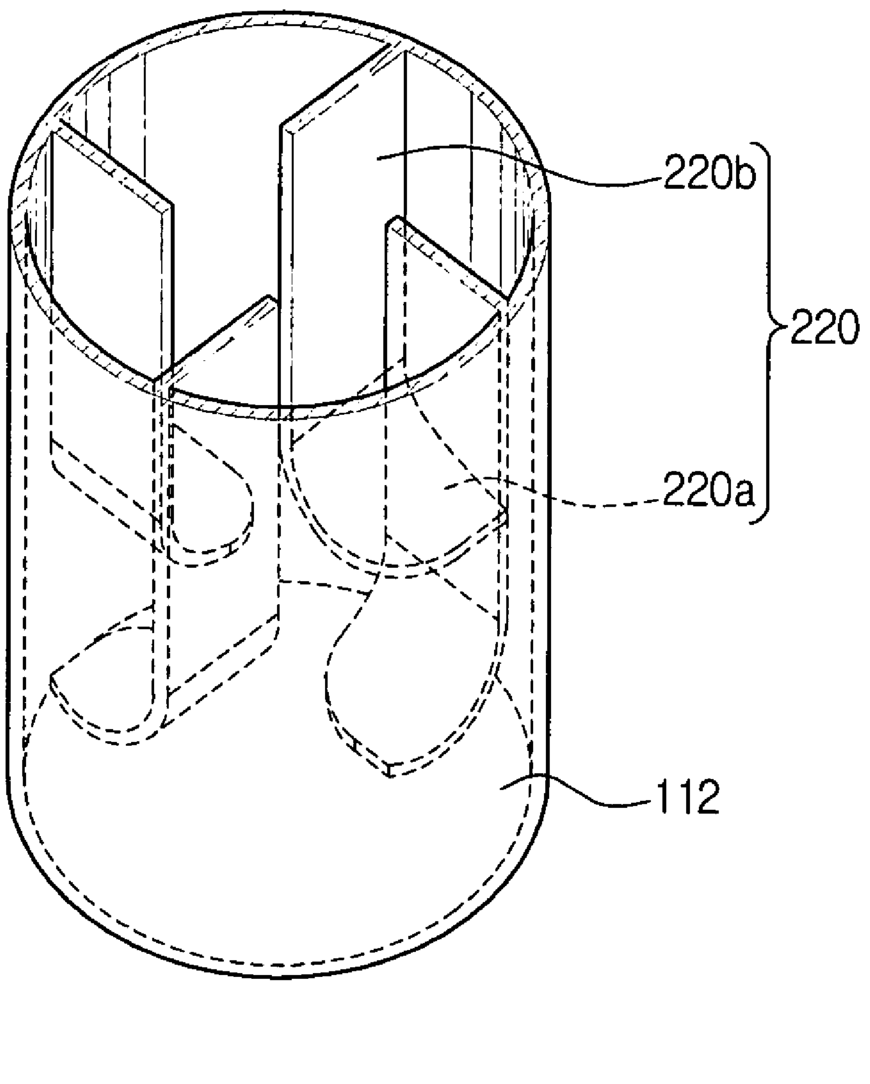
FIG. 13 is a perspective view of a discharge pipe having a bent guide rib according to another alternate exemplary embodiment of the present invention.

According to another embodiment of the present invention, the air guide member 200 may comprise three (3) or two (2) twisted guide ribs leaving the air passage 211 in a center as shown in FIGS. 11 and 12, or four guide ribs 220 having the bent part 220*a* and the linear part 220*b* as shown in FIG. 13. The operation thereof are the same as when four guide ribs are mounted, and therefore, the description will be omitted for conciseness.

As described above, if the air passage guide member 200 is mounted in the discharge pipe 122 of the second cyclone unit 112, a pressure loss can reduce which is caused by a turbulence during discharging. Therefore, load of a suction source decreases to reduce power consumption for operation of the cyclone dust collecting apparatus 100.

The air passage guide member 200 reduces a current speed of air discharging via the discharge pipe, and therefore, a mutual noise can decrease in the discharge pipe 122 due to stiff change of air current.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A cyclone dust collecting apparatus comprising:

a first cyclone unit, and at least one second cyclone unit having an air passage for guiding air discharged via the first cyclone unit into the at least one second cyclone unit and a discharge pipe, wherein the discharge pipe comprises a passage guide member for guiding air discharged from the second cyclone unit, wherein the passage guide member comprises a plurality of guide ribs formed in an inner circumference of the discharge pipe, wherein the guide ribs are protruded from the inner circumference of the discharge pipe in a direction toward a center of the discharge pipe, wherein the guide ribs leave an air passage in the center of the discharge pipe, wherein the guide ribs are spaced apart from an inlet end of the discharge pipe in a direction of air movement, wherein the guide ribs comprise a bent part and a linear part, wherein the bent part is disposed at an inlet end of the discharge pipe, wherein the linear part is disposed at an outlet end of the discharge pipe, wherein the bent part and the linear part are integrally formed with each other, wherein the bent part comprises a round part to prevent contaminants in air from blocking the discharge pipe, and wherein the bent part is twisted.

2. A cyclone dust collecting apparatus comprising:

a cyclone body unit having a first cyclone and a plurality of second cyclone bodies disposed along the first cyclone;

an inlet and outlet unit engaged with an upper portion of the cyclone body unit, and having an air passage and a discharge pipe of the second cyclone unit;

a cover collecting air discharged from the plurality of second cyclone bodies to guide the air to a cleaner body;

a sealing member disposed between the cyclone body unit and the inlet and outlet unit; and a dust collecting receptacle engaged with a lower portion of the cyclone body unit for collecting contaminants, wherein the discharge pipe comprises at least one guide rib protruded from an inner circumference toward a center of the discharge pipe, wherein the guide ribs are spaced at a certain interval along the inner circumference of the discharge pipe, and wherein the guide ribs comprise a linear part and a bent part, and the bent part is twisted.

3. The apparatus according to claim 2, wherein the guide ribs are protruded from the inner circumference of the discharge pipe as high as 5 percent to 45 percent of a inside diameter of the discharge pipe.

4. A cyclone dust collecting apparatus comprising:

a plurality of second cyclone units each having an air inlet passage and a discharge pipe, the discharge pipe having a passage guide member for guiding air discharged from each of the plurality of second cyclone units, the passage guide member including a plurality of guide ribs formed in an inner circumference of the discharge pipe, the plurality of guide ribs protruding from the inner circumference in a direction toward a center of the discharge pipe, the plurality of guide ribs have a twisted configuration, wherein the plurality of guide ribs are spaced apart from an inlet end of the discharge pine in a direction of air movement.

5. The apparatus according to claim 4, further comprising a first cyclone unit, the air inlet passage guiding air discharged from the first cyclone unit into the plurality of second cyclone units.

6. The apparatus according to claim 4, wherein the guide ribs comprise a bent part and a linear part.

7. The apparatus according to claim 6, wherein the bent part is disposed at the inlet end of the discharge pipe and the linear part is disposed at an outlet end of the discharge pipe.

8. The apparatus according to claim 7, wherein the bent part comprises a round part to prevent contaminants in air from blocking the discharge pipe.

* * * * *